United States Patent [19]
Andres et al.

[11] 3,840,729

[45] Oct. 8, 1974

[54] PNEUMATIC CONTROL SYSTEM FOR AUTOMATIC ALIGNMENT OF MOTOR VEHICLE HEADLIGHTS

[75] Inventors: Rudolf Andres, Sindelfingen; Hermann Moller, Aidlingen; Franz Seyfried, Sindelfingen, all of Germany

[73] Assignee: Daimler-Benz Aktiengesellschaft, Stuttgart, Germany

[22] Filed: Oct. 2, 1972

[21] Appl. No.: 294,180

[30] Foreign Application Priority Data
Oct. 2, 1971 Germany............................ 2149269

[52] U.S. Cl............................. 240/7.1 LJ, 240/62.3
[51] Int. Cl............................................... B60q 1/10
[58] Field of Search ............. 240/7.1 LJ, 62.2, 62.3

[56] References Cited
UNITED STATES PATENTS

| | | | |
|---|---|---|---|
| 2,575,085 | 11/1951 | Alyea................................. | 91/47 X |
| 3,551,668 | 12/1970 | Ravolier ........................ | 240/7.1 LJ |
| 3,596,837 | 8/1971 | Todd ................,................ | 240/7.1 LJ |

FOREIGN PATENTS OR APPLICATIONS

| | | | |
|---|---|---|---|
| 1,506,590 | 12/1967 | France.............................. | 240/62.3 |

*Primary Examiner*—Samuel S. Matthews
*Assistant Examiner*—Russell E. Adams, Jr.
*Attorney, Agent, or Firm*—Craig & Antonelli

[57] ABSTRACT

A pneumatically operating control system for the automatic alignment of motor vehicle headlights which includes control elements coordinated to one or both axles of the motor vehicle which align the motor vehicle headlights to a constant light distance as a function of the change of the distance of the respective axle to the body of the motor vehicle; the control system is fed with vacuum and the control elements are constructed as pressure modulators; in case of a temporary absence of the vacuum in the suction pipe caused by the driving condition, the instantaneous position of the headlights is maintained over an adjustable period of time by means of a closure valve while the headlights are automatically transferred into a base position in conformity to official, prescribed regulations in case of loss of the vacuum caused by leakages in the system.

44 Claims, 1 Drawing Figure

PATENTED OCT 8 1974 3,840,729
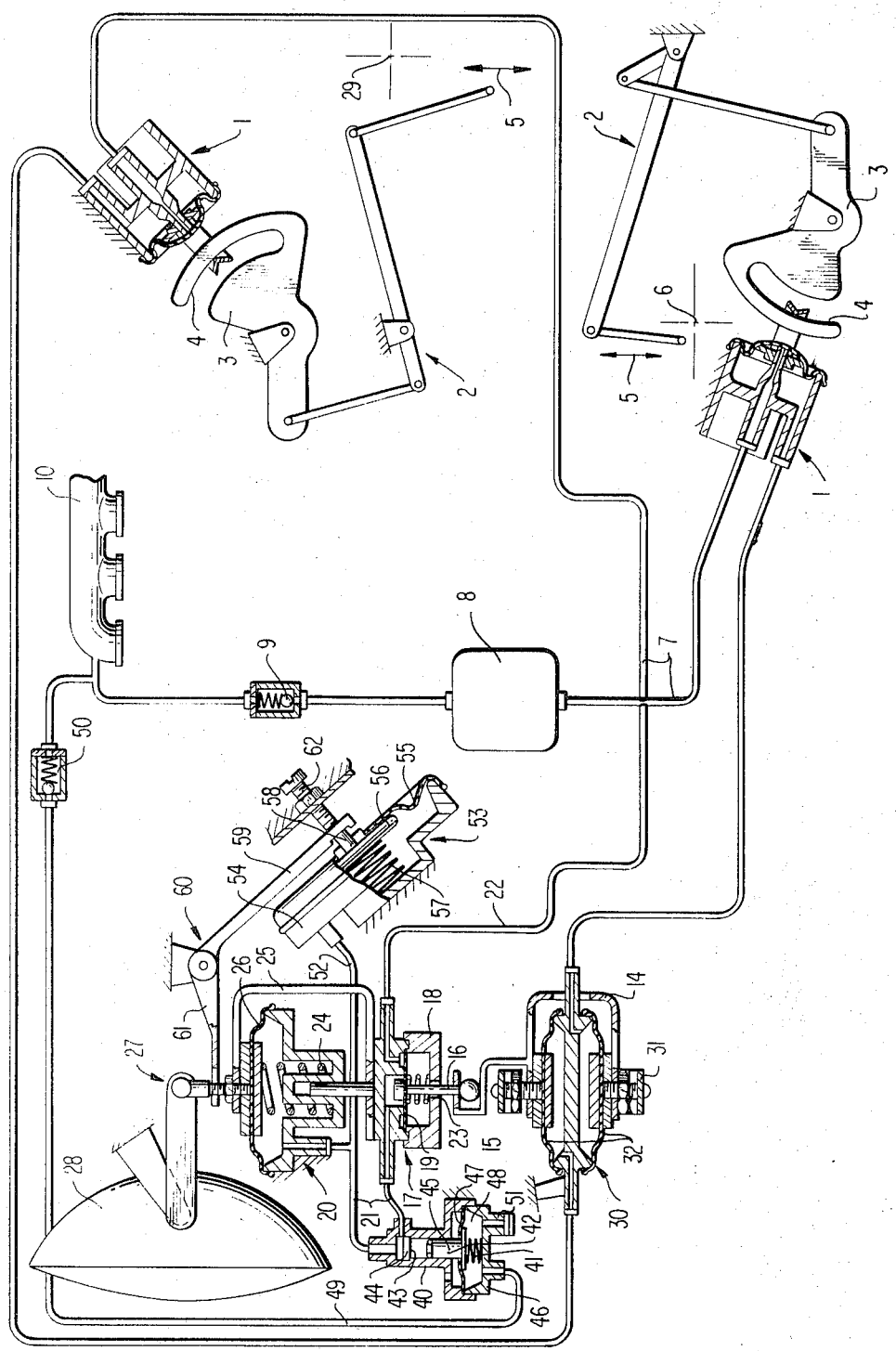

PNEUMATIC CONTROL SYSTEM FOR AUTOMATIC ALIGNMENT OF MOTOR VEHICLE HEADLIGHTS

The present invention relates to a pneumatically operating control installation for the automatic alignment of motor vehicle headlights, consisting of control elements coordinated to one or both axles of the motor vehicle, which align the motor vehicle headlights by way of adjusting motors and of a control shifting or switching device to a constant distance in dependence on the change of the distance of the respective axle relative to the body of the motor vehicle, whereby the control installation is supplied with vacuum and the control elements are constructed as pressure modulators as disclosed in the co-pending application Ser. No. 195,984, filed on Nov. 5, 1971, and assigned to the assignee of the instant application, the subject matter of which is incorporated herein to the extent necessary.

In the embodiments described in the aforementioned co-pending application, a possibility is already created by the arrangement of a supply or reservoir tank downstream of a check valve to continue to operate the control installation also when driving with a fully opened throttle or the like, during which, as is known, no vacuum exists in the suction pipe. However, it is frequently not possible for space reasons to accommodate a sufficiently large tank.

Furthermore, mention has already been made by reference to the aforementioned embodiments that in case of loss of the vacuum in the line system which may occur as a result of longer operating pauses--however, also for example, as a result of a break in a line--the diaphragms of the adjusting motor are fully extended, and the headlights are then disposed in a downwardly directed end position. This extreme control position of the headlights may well be necessary with a strongly loaded vehicle, however, it will prove disadvantageous, for example, with an unloaded vehicle during a failure of the system because the light distance then is sharply reduced. It is the aim of the present invention to so improve the prior art control installation that also with the installation of smaller tanks and with a temporary absence or with a loss of the vacuum, a sufficient distance of the headlights is assured always.

Accordingly, it is proposed according to the present invention to maintain during a temporary absence of the vacuum in the suction pipe, caused by the driving condition, the respective instantaneous position of the headlights by means of a closure valve over an adjustable period of time, and in case of loss of the vacuum caused by leakages in the system, to displace the headlights automatically into the basic position corresponding to the legal regulations—initiated by an operating element.

According to a further features of the present invention, the closure valve may include a piston acted upon by a spring and provided at its upper end with a seal, which subdivides a space by means of a diaphragm secured at its lower end and at the housing, which space is in communication, on the one hand with the suction pipe by way of a line under interconnection of a check valve and, on the other, with the atmospheric air by way of an adjustable throttling device.

Appropriately, the piston is arranged longitudinally displaceably in the housing and closes off in the absence of the vacuum a line leading from a control shifting element to an adjusting motor after abutment of the seal.

The operating elements responding during loss of the vacuum may include a diaphragm having a centrally disposed spring dish and arranged within a cell-like housing connected by way of a line with the adjusting motor and may be actuated by a spring, whereby a pin projecting outwardly from the spring dish acts on a leg portion of a bell-crank whose other leg portion surrounds approximately fork-like the adjusting linkage in direct proximity of the one end of the adjusting rod or the end of the adjusting rod itself.

In order that no feedback effect on the adjusting movement occurs during the normal operation, the leg portion operatively connected with the pin is constructed longer than the other leg portion of the bell-crank.

An adaptation to regionally different regulations as regards the headlight distance can take place readily if the longer leg portion during response of the operating element comes into abutment at a preferably adjustable stop.

Accordingly, it is an object of the present invention to provide a pneumatically operating control system for the automatic alignment of motor vehicle headlights which avoids by simple means the aforementioned shortcomings and drawbacks encountered in the prior art.

Another object of the present invention resides in a pneumatically operating control installation for the automatic alignment of motor vehicle headlights which obviates the need of large vacuum tanks or reservoirs, yet assures satisfactory operation of the headlights during failures in the vacuum system.

A further object of the present invention resides in a pneumatically operating control system for automatically aligning the headlights of motor vehicles which assures a sufficient light range of the headlights even in case of temporary absences or in case of a loss of the vacuum.

Still a further object of the present invention resides in a control system for automatically aligning the headlights of motor vehicles in which in case of temporary loss of the operating medium the headlights are retained in their instantaneous position for a predetermined period of time and in which the headlights are adjusted to a position corresponding to the legal, official regulations during loss of the operating medium.

Another object of the present invention resides in a control system of the aforementioned type which is relatively simple in construction, yet offers great versatility as to its adaptation to locally different regulations as regards the prescribed light range of the headlights.

These and further objects, features and advantages of the present invention will become more apparent from the following description when taken in connection with the accompanying drawing which shows, for purposes of illustration only, one embodiment in accordance with the present invention, and wherein:

The single FIGURE is a somewhat schematic view, partially in cross section, of a control installation for the automatic alignment of the headlights of a motor vehicle in accordance with the present invention.

Referring now to the single FIGURE of the drawing, two pressure modulators generally designated by reference numeral 1 are secured at the body or at any other suitable fixed part of a motor vehicle. The pressure modulators 1 detect by way of a linkage generally designated by reference numeral 2 connected with the respective vehicle axle and by way of a control cam 4 arranged at a lever 3, the vertical movements 5 of the rear axle 6 and of the front axle 29. The pressure modulators 1 which are thus actuated in dependence on the relative movements between the corresponding axle and the vehicle body, are operatively connected with a suction pipe 10 of an internal combustion engine (not shown) by way of a line 7 in which is interconnected a reservoir tank 8 and a check valve 9. An adjusting motor generally designated by reference numeral 30 is acted upon by the vacuum modulated by the pressure modulators 1 in dependence on the position of the body with respect to the respectively associated axle against the force of an externally disposed spring 31 extended about the same. The diaphragms 32 are connected by way of an angularly bent rod 14 also extended about the adjusting motor 30 and by way of a ball joint 15 with a mushroom piston 16 of a control shifting device generally designated by reference numeral 17. The latter is so constructed that the mushroom-piston 16 displaceably arranged in a flat cylindrical housing 18 acts on a diaphragm 19 of the control shifting device 17 as a function of the movement of the diaphragms 32 in such a manner that either a preferably flexible line 21 is connected with an also preferably flexible line 22 branching off from the line 7, or that the line 21 is in communication with the atmosphere by way of an aperture 23 in the bottom of the housing 18—which simultaneously receives the mushroom piston 16 with play. The vacuum which builds up in a second adjusting motor generally designated by reference numeral 20, acts on a diaphragm 26 which is pulled-in against the force of a spring 24. An angularly bent adjusting rod 25 extended about the adjusting motor 20 is connected at one end with the diaphragm 26 of the adjusting motor 20 and at the other end with the housing 18 of the control shifting device 17. An adjusting linkage generally designated by reference numeral 27 for changing the position of the headlights 28 adjoins the diaphragm 26.

The construction described so far corresponds to one of the two embodiments of the aforementioned patent application. However, it is also feasible within the scope of the present invention to utilize instead of the two pressure modulators, only a single pressure modulator which could then be coordinated, for example, to the rear axle.

Complementing the embodiment described so far, a closure valve 40 is inserted into the line 21 which includes a piston 42 spring-loaded by a spring 41, which at its upper end 43 is equipped with a seal 44. A space 48 is subdivided by a diaphragm 47 secured at the lower end 45 of the piston 42 and at the housing 46 of the closure valve 40; the space 48 is in communication, on the one hand, by way of a line 49 under interposition of a checkvalve 50 with the suction pipe 10 and, on the other, by way of an adjustable throttling device 51 with the atmospheric air. A line 52 leads from the end line 21, upstream of its connection with the adjusting motor 20, to an operating element generally designated by reference numeral 53. Its housing 54 includes a diaphragm 55 having a centrally disposed spring dish 56 which is acted upon by a spring 57. A pin 58 projecting outwardly from the spring dish 56 acts on a leg portion 59 of a bell crank 60 whose other leg portion 61 surrounds approximately fork-like the adjusting linkage 27 in direct proximity of one end of the adjusting rod 25. The leg portion 59, which is constructed longer than the leg portion 61 comes into abutment at an adjustable stop 62 during the response of the operating element 53.

During all partial-load driving conditions, vacuum is present in the suction pipe 10 which continues by way of the check valve 50 and the line 49 to the closure valve 40. Atmospheric air reaches simultaneously the space 48 by way of the throttling device 51. As a result of the vacuum effect, the diaphragm 47 and together with the same, the piston 42 are displaced downwardly against the force of the spring 41 and a communication is produced between the two line branches of line 21. The installation then operates as described in the aforementioned copending application.

The vacuum in the suction pipe 10 becomes approximately zero when the internal combustion engine operates at full load. The line 49 is now closed on one side by the check valve 50 and atmospheric air reaches the space 48 by way of the throttling device 51. The spring 41 forces the diaphragm 47 and the piston 42 in the upward direction until the seal 44 comes into abutment and closes off the line 21. Thus, the position of the headlight 28 which prevails at the instant of the closure operation, is maintained for such length of time until vacuum becomes available again as a result of transition into another driving condition. Due to the adjustability of the throttling device 51, the instant of time up to the temporary inoperativeness of the control installation can be extended in dependence on the reservoir volume of the tank 8 so that, for example, a response takes place only after relatively longer full-gas drive, i.e., after a relatively longer drive with wide open throttle or the like.

During the described driving conditions, the operating elements 53 is in its illustrated position due to the vacuum effect, which stems from the fact that the diaphragm 55 and the spring dish 56 together with the pin 58 are pulled in the direction toward the bottom of the housing 54 against the force of the spring 57. The bell crank 60 is thereby freely movable and exerts no feedback effect on the adjusting movement of the adjusting rod 25. Only during a sudden collapse of the vacuum which may occur, for example, as a result of a leak in the line system, the pin 58 moves in the direction toward the leg portion 59 of the bell crank 60 and forces the latter against the adjustable abutment 62. The other leg portion 61 then acts on one end of the adjusting rod 25 and thus also on the adjusting linkage 27 and displaces the headlights into an accurately predetermined position.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A control installation for automatically aligning motor vehicle headlight means on motor vehicles of the type having axles and a superstructure which is relatively movable with respect to at least one of said axles; said installation comprising:

first adjusting motor means actuable in response to supply of a pressure medium to said first adjusting motor means, first interconnecting means for interconnecting said first adjusting motor means to said headlights such that actuation of said first adjusting motor means effects changes in the inclination of said headlights with respect to the superstructure, first circuit means for substantially continuously supplying a pressure medium during operation of said vehicle, control valve means movable between a first control valve position for communicating said first adjusting motor means with said pressure medium in said first circuit means to actuate said first adjusting motor means and a second control valve position for communicating said first adjusting motor means with other than said pressure medium, control installation means for automatically and continuously controlling the movement of said control valve means in response to relative changes in position of at least one of said axles with respect to said superstructure during operation of said vehicle, including during at least a portion of the operation of said vehicle with said vehicle in motion, and headlight position maintaining means for maintaining the respective instantaneous position of the headlight means for a predetermined period of time in the event of a temporary predetermined reduction in magnitude of the supply of said pressure medium during operation of said vehicle.

2. A control installation according to claim 1, characterized in that the period of time for maintaining the headlights in the respective instantaneous position is adjustable.

3. A control installation according to claim 2, characterized in that the pressure medium is vacuum which is obtained from a suction pipe of an internal combustion engine driving the motor vehicle.

4. A control installation according to claim 1, characterized in that the closure valve means includes a piston spring-loaded by a spring and provided at its upper end with a seal, said piston subdividing by means of a diaphragm secured at its lower end and at a housing means a space provided within the housing means which, on the one hand, is in communication with a suction pipe of an engine of the vehicle by way of a line under interposition of a check valve and, on the other hand, with the atmospheric air by way of a throttling means, said suction pipe also serving to supply pressure medium to said first circuit means.

5. A control installation according to claim 4, characterized in that the throttling means is adjustable.

6. A control installation according to claim 4, characterized in that the piston is longitudinally displaceably arranged in the housing means and upon abutment of the seal, in the absence of the operating medium, closes off a line leading from the control valve means to the first adjusting motor means.

7. A control installation according to claim 1, wherein said headlight position maintaining means includes a closure valve means interposed between said control valve means and said first adjusting motor means for selectively closing off pressure medium communication between said control valve means and said first adjusting motor means.

8. A control installation according to claim 7, further comprising time delay means for delaying the closing of said closure valve means by a predetermined time following said temporary predetermined reduction in magnitude of the supply of said pressure medium.

9. A control installation according to claim 8, wherein said time delay means includes time delay adjustment means for varying the magnitude of the predetermined time delay.

10. A control installation according to claim 9, wherein said time delay means includes an adjustable throttle valve which communicates a pressure chamber of said closure valve means with atmosphere.

11. A control installation according to claim 7, wherein the closure valve means includes: a piston spring-loaded by a spring and provided at one end with a seal, a closure valve housing means, and a diaphragm secured to the other end of the piston, said diaphragm being secured at said housing means to form a space in said housing means at the side opposite the piston means, said space being communicated with said first circuit means by way of a line and check valve and with atmospheric air by way of a throttling means, said seal being movable with said piston in response to changes in pressure in said space between positions opening and closing a line leading from said control valve means to said first adjusting motor means.

12. A control installation according to claim 1, further comprising headlight base position return means for automatically displacing the headlight means into a predetermined base position in the event of a predetermined reduction in magnitude of said pressure medium supply.

13. A control installation according to claim 12, characterized in that the headlight base position return means includes, within a box-like housing connected with the first adjusting motor means by way of a line, a diaphragm having a substantially centrally disposed spring dish and is acted upon by a spring, and in that a pin projecting outwardly from the spring dish acts on one leg portion of a bell crank whose other leg portion is operatively connected with said first interconnecting means.

14. A control installation according to claim 13, characterized in that the other leg portion surrounds approximately fork-like an adjusting linkage means of said first interconnecting means in direct proximity of one end of its adjusting rod.

15. A control installation according to claim 13, characterized in that the other leg portion surrounds approximately fork-like the end of an adjusting rod of the first interconnecting means.

16. A control installation according to claim 13, characterized in that the leg portion operatively connected with the pin is constructed longer than the other leg portion of the bell crank and comes into abutment at a stop means upon a predetermined movement of said pin.

17. A control installation according to claim 16, characterized in that the stop means is adjustable.

18. A control installation according to claim 12, wherein said headlight base position return means includes a member operatively engageable with said first interconnecting means to move said first interconnecting means to a position corresponding to displacement of said headlight means into said base position independently of the particular instantaneous position of said first adjusting motor means.

19. A control installation according to claim 18, wherein said member is connected to a diaphragm assembly which is movable in response to predetermined changes in the supply of said pressure medium.

20. A control installation according to claim 19, wherein one side of said diaphragm assembly is spring-loaded and is communicated with said pressure medium and wherein said member is a pivotally mounted bell crank which has a first leg portion surrounding an adjusting rod of said first interconnecting means and a second leg portion operatively connected with a pin attached to said diaphragm assembly.

21. A control installation according to claim 20, wherein said first leg portion is shorter than said second leg portion with respect to the pivotal mount of said bell crank.

22. A control installation according to claim 19, wherein an adjustable stop is arranged on said pin for abutting engagement with said second leg portion.

23. A control installation according to claim 12, wherein said headlight base return means includes adjusting means for accommodating adjustment of said predetermined base position.

24. A control installation according to claim 1, wherein said first circuit means is communicated directly with a suction pipe of an engine of said vehicle, whereby said pressure medium in said first circuit means is at subatmospheric pressure corresponding to suction pipe pressure.

25. A control installation according to claim 24, wherein said control installation includes: second adjusting motor means actuable in response to supply of a pressure medium to said second motor means,
second interconnecting means for interconnecting said second motor means to said control valve means to move said control valve means,
second circuit means for communicating a pressure medium to said second motor means,
and pressure modulator means for modulating the pressure of the pressure medium in said second circuit means in direct response to the relative changes in position of at least one of said axles with respect to said superstructure.

26. A control installation according to claim 12, wherein said predetermined base position substantially corresponds to predetermined safety positions for the headlight light range.

27. A control installation according to claim 12, wherein said last-mentioned predetermined reduction in magnitude of said pressure medium supply corresponds to leakage in the first circuit means.

28. A control installation according to claim 27, characterized in that the closure valve means includes a piston spring-loaded by a spring and provided at its upper end with a seal, said piston subdividing by means of a diaphragm secured at its lower end and at a housing means a space provided within the housing means which, on the one hand, is in communication with a suction pipe of an engine of the vehicle by way of a line under interposition of a check valve and, on the other hand, with the atmospheric air by way of a throttling means, said suction pipe also serving to supply pressure medium to said first circuit means.

29. A control installation according to claim 28, characterized in that the throttling means is adjustable.

30. A control installation according to claim 29, characterized in that the piston is longitudinally displaceably arranged in the housing means and upon abutment of the seal, in the absence of the operating medium, closes off a line leading from the control valve means to the first adjusting motor means.

31. A control installation according to claim 30, characterized in that the headlight base position return means includes, within a box-like housing connected with the first adjusting motor means by way of a line, a diaphragm having a substantially centrally disposed spring dish and is acted upon by a spring, and in that a pin projecting outwardly from the spring dish acts on one leg portion of a bell crank whose other leg portion is operatively connected with said first interconnecting means.

32. A control installation according to claim 31, characterized in that the other leg portion surrounds approximately fork-like an adjusting linkage means of said first interconnecting means in direct proximity of one end of its adjusting rod.

33. A control installation according to claim 31, characterized in that the other leg portion surrounds approximately fork-like the end of an adjusting rod of the first interconnecting means.

34. A control installation according to claim 31, characterized in that the leg portion operatively connected with the pin is constructed longer than the other leg portion of the bell crank and comes into abutment at a stop means upon a predetermined movement of said pin.

35. A control installation according to claim 34, characterized in that the stop means is adjustable.

36. A control installation according to claim 35, characterized in that the other leg portion surrounds approximately fork-like an adjusting linkage means of said first interconnecting means in direct proximity of one end of its adjusting rod.

37. A control installation according to claim 35, characterized in that the other leg portion surrounds approximately fork-like the end of the adjusting rod of the adjusting linkage means.

38. A control installation for automatically aligning motor vehicle headlight means on motor vehicles of the type having axles and a superstructure which is relatively movable with respect to at least one of said axles; said installation comprising:
first adjusting motor means actuable in response to supply of a pressure medium to said first adjusting motor means, first interconnecting means for interconnecting said first adjusting motor means to said headlights such that actuation of said first adjusting motor means effects changes in the inclination of said headlights with respect to the superstructure, first circuit means for substantially continuously supplying a pressure medium during operation of said vehicle,
control valve means movable between a first control valve position for communicating said first adjusting motor means with said pressure medium in said first circuit means to actuate said first adjusting motor means and a second control valve position for communicating said first adjusting motor means with other than said pressure medium, control installation means for automatically and continuously controlling the movement of said control valve means in response to relative changes in position of at least one of said axles with respect to said superstructure during operation of said vehicle, including during at least a portion of the operation of said vehicle with said vehicle in motion, and headlight base position return means for automatically displacing the headlight means into a predetermined base position in the event of a predetermined reduction in magnitude of said pressure medium supply.

39. A control installation according to claim 38, wherein said headlight base position return means includes a member operatively engageable with said first interconnecting means to move said first interconnecting means to a position corresponding to displacement of said headlight means into said base position independently of the particular instantaneous position of said first adjusting motor means.

40. A control installation according to claim 39, wherein said member is connected to a diaphragm assembly which is movable in response to predetermined changes in the supply of said pressure medium.

41. A control installation according to claim 40, wherein one side of said diaphragm assembly is spring-loaded and is communicated with said pressure medium and wherein said member is a pivotally mounted bell crank which has a first leg portion surrounding an adjusting rod of said first interconnecting means and a second leg portion operatively connected with a pin attached to said diaphragm assembly.

42. A control installation according to claim 41, wherein said first leg portion is shorter than said second leg portion with respect to the pivotal mount of said bell crank.

43. A control installation according to claim 40, wherein an adjustable stop is arranged on said pin for abutting engagement with said second leg portion.

44. A control installation according to claim 38, wherein said headlight base return means includes adjusting means for accommodating adjustment of said predetermined base position.

* * * * *